US007464398B2

United States Patent
Robert et al.

(10) Patent No.: US 7,464,398 B2
(45) Date of Patent: *Dec. 9, 2008

(54) QUEUING METHODS FOR MITIGATION OF PACKET SPOOFING

(75) Inventors: Jean-Marc Robert, Ottawa (CA); Scott David D'Souza, Ottawa (CA); Paul Kierstead, Ottawa (CA)

(73) Assignee: Alcatel Lucent, Paris (FR)

( * ) Notice: Subject to any disclaimer, the term of this patent is extended or adjusted under 35 U.S.C. 154(b) by 944 days.

This patent is subject to a terminal disclaimer.

(21) Appl. No.: 10/440,233

(22) Filed: May 19, 2003

(65) Prior Publication Data

US 2004/0250123 A1 Dec. 9, 2004

(51) Int. Cl.
*G06F 7/04* (2006.01)
*G06F 17/30* (2006.01)
*H04L 9/32* (2006.01)
*H04L 9/00* (2006.01)

(52) U.S. Cl. .................. 726/3; 726/23; 726/24; 726/25; 726/26; 726/27; 713/151; 713/152; 713/153; 713/154; 713/168; 713/169; 713/170; 713/171; 380/229; 380/230; 380/231; 380/232; 380/233

(58) Field of Classification Search .............. 726/3
See application file for complete search history.

(56) References Cited

U.S. PATENT DOCUMENTS 6,167,445 A * 12/2000 Gai et al. ............. 709/223

2001/0052024 A1 * 12/2001 Devarakonda et al. ...... 709/238
2003/0110393 A1 * 6/2003 Brock et al. ................ 713/200
2003/0236999 A1 * 12/2003 Brustoloni .................. 713/201

OTHER PUBLICATIONS

Williamson, *Throttling Viruses: Restricting Propagation to defeat malicious mobile code*, Jun. 17, 2003 (7 sheets).
T. Peng et al, *Protection from Distributed Denial of Service Attack Using History-based Filtering*, May 14, 2003 (6 sheets).
Floyd, S. et al, *Random Early Detection Gateways for Congestion Avoidance*, IEEE/ACM Transactions on Networking, V.1 No. 4, Aug. 1993, p. 397-413.

* cited by examiner

*Primary Examiner*—Longbit Chai

(57) ABSTRACT

Systems and methods of mitigating attacks, such as Denial of Service (DoS) attacks, in a communications network are presented. Source addresses of packets received at network devices are monitored in relation to known reliable addresses stored in a decision engine. If the source address, as stored in a source table, is known as being legitimate the packets are placed in a high priority queue for transmission at the highest rate. Packets with an unknown address are placed in a lower priority queue, the source address stored in a different source table, and the packet is serviced at a lower rate. Packets that become known to be legitimate are moved from the unknown table to the table from which high priority queues are serviced. In this way, an attacker that employs spoofing techniques is prevented from overtaxing network resources.

9 Claims, 5 Drawing Sheets

QUEUING METHODS FOR MITIGATION OF PACKET SPOOFING

FIELD OF THE INVENTION

This invention relates to communications networks and more particularly to methods and apparatus for mitigating service disrupting attacks such as denial of service (DOS) attacks in communications networks.

BACKGROUND

In communications systems such as those employing TCP/IP, data is transferred between end users via packets having a header which includes source and destination addresses. In a well behaved system the source and destination addresses allow a network user to communicate with and retrieve information from a server over the Internet. In the present description network users employ network devices which may be included in a local area network (LAN).

In recent years, malicious users of Internet services have been known to temporarily disrupt or even shut down Internet sites. This is typically done by taking advantage of inherent characteristics in the TCP protocol. For example, TCP uses a three-way handshaking protocol on connection set up. The handshake includes an acknowledgement message from the server to the user and one from the user to the server which confirm receipt of a message. An attacker is able to use a false source address (known as spoofing) which means that the server is unable to complete the acknowledgement portion of the protocol handshake. The server holds or stores incomplete or half opened connections for a period of time. During that time interval the attacker can flood the server and ultimately take the server out of service.

Similarly, an attacker wishing to disrupt an end user such as a user of a local area network can flood the LAN with multiple messages each having a phony or spoofed source address. Such an attack is known as a denial of service (DOS) attack which, ultimately, can shut down or deny service to the local area network.

Generally speaking a denial of service attack involves blocking a network user's ability to use some of the services provided by the network. DOS attacks are common across the Internet with many being launched daily at various targets. Many of the attacks involve specially constructed packets designed to either take advantage of flaws in the software or to tie up resources within devices. The biggest obstacle in reacting to packet flooding attacks is the ability of the attacker to spoof i.e. disguise the source address of the packets.

In the prior art, solutions have been proposed to mitigate the effect of computer viruses which search networks for vulnerable hosts. In a particular solution which is described, by Williamson M. M., in an article entitled "Throttling Viruses: Restricting propagation to defeat malicious mobile code", (Jun. 17, 2002) packets with unknown destinations or hosts i.e. destinations or hosts that haven't been seen before, are subject to a series of timeouts that limits the rate of connections. This solution is host based using a mechanism designed to slow worm propagation. The above described solution examines the destination or host rather than the source addresses of packets and is not specifically designed to be network based.

Another prior art related to this invention has been presented by T. Peng, C. Leckie and K Ramamohanarao in an article entitled "Protection from Distributed Denial of Service Attack Using History-based Filtering" (to be presented May 14, 2003 but available earlier on the Internet). This solution is based on the notion of "good" and "unknown" source addresses. Under normal condition, their solution examines the source addresses of all IP packets. They keep the source addresses of all packets which appear more than k times (for some constant k). They also keep the source addresses of all packets which appear in at least d of the last n days (for some constants d and n). The source addresses fulfilling at least one of these two conditions define the "good" packets. Once a high-level network utilization that leads to packets being dropped is observed, this solution blocks any packets which do not have "good" source addresses. One major flaw of this approach is that it is effective only after that a high bandwidth attack has been detected—therefore, an independent detection mechanism has to be provided. This may be useless for low bandwidth attack like the TCP SYN flood attack. Another flaw of this approach is to partition the source addresses into only two categories.

SUMMARY OF THE INVENTION

The present invention relates to a mechanism for mitigating the affects of a packet flooding DOS attack by giving packet queue priority to clients which have been recognized as legitimate.

According to the present invention the packet queue priority technique is implemented in the network between a network device such as a LAN and the rest of the Internet and is designed particularly to mitigate DOS attacks on the LAN devices.

In accordance with an aspect of the present invention there is provided an apparatus for providing priority queuing to packets at a network device in a communications network, comprising: a decision engine, at the network device, for receiving packets from the communications network and queuing each of the packets into an available queue wherein n queues shall be available and n≧2, in dependence upon a source address of the packet; and a scheduler for de-queuing packets from the queues for transmission to the network device wherein packets from the queues are de-queued at different rates depending on a level of trust associated to the source addresses. The higher the trust in the addresses the higher the rate at which the packets are de-queued from the given queue.

In accordance with a second aspect of the present invention there is a method of providing priority queuing to selected packets at a network device in a communications network, the method comprising: receiving packets from the communications network in a decision module at the network device; queuing each of the packets into an available queue wherein n queues shall be available, n≧2, in dependence upon a source address of the packet; and de-queuing packets from the queues for transmission to the network device wherein packets from the queues are de-queued at different rates depending on a level of trust associated with the source addresses. The higher the trust in the addresses, the higher the rate at which the packets are de-queued from the given queue.

BRIEF DESCRIPTION OF THE DRAWINGS

The invention will now be described in greater detail having reference to the attached drawings wherein.

DETAILED DESCRIPTION OF THE INVENTION

Figure 1:
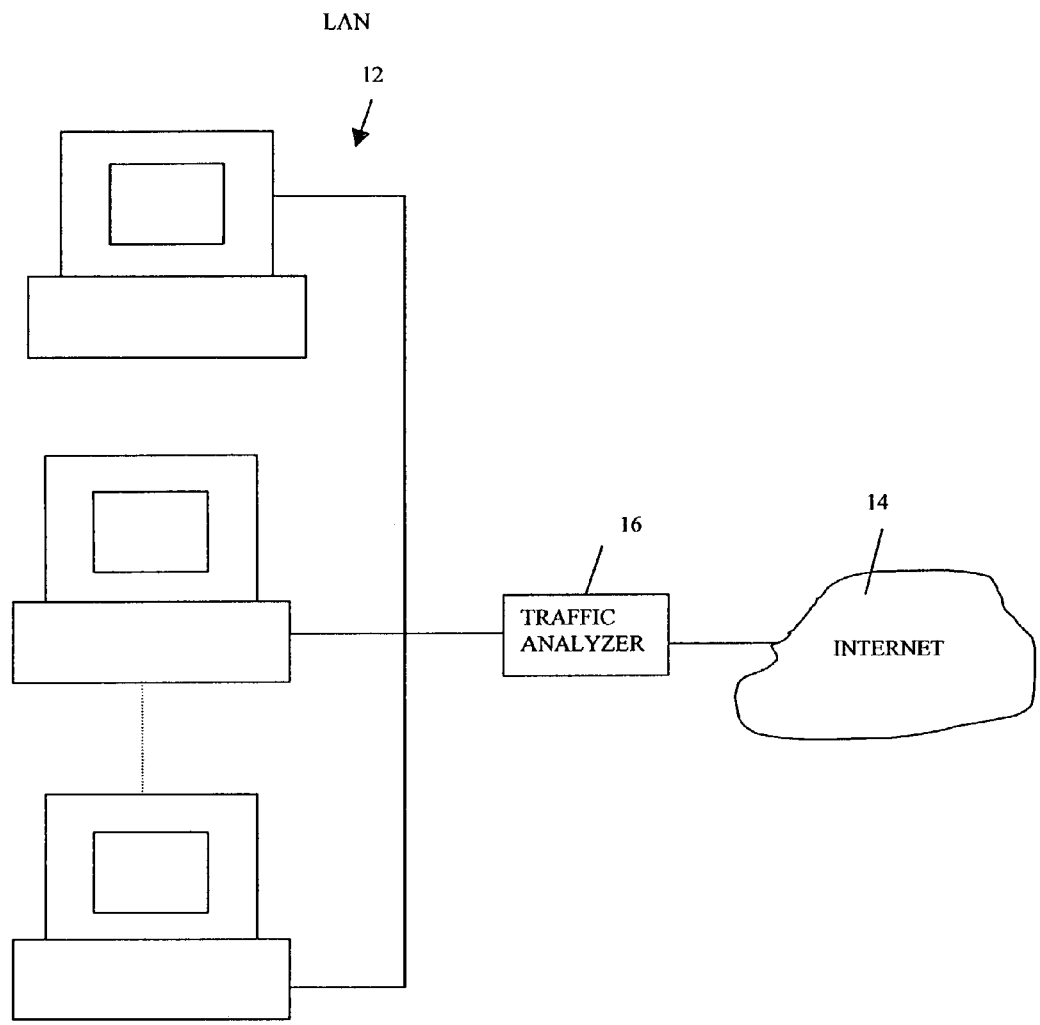
FIG. 1 is a high level illustration of the communication network of the present invention.

FIG. 1 illustrates, at a high level, elements of the present invention. Network devices such as a LAN shown generally by reference numeral 12 is connected to the network such as Internet 14. A traffic analyzer 16, which will be described in greater detail hereinafter, is implemented between the Internet and the network devices.

Figure 2:
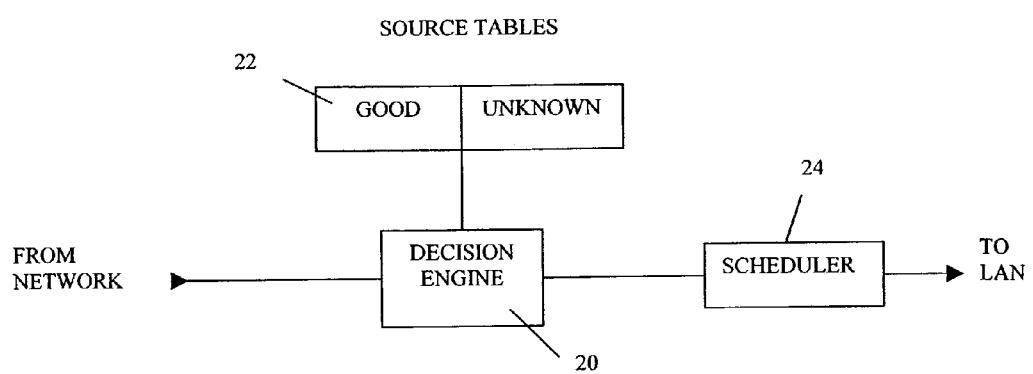
FIG. 2 illustrates a physical embodiment of the solution.

According to the invention the traffic analyzer 16, as shown in FIG. 2, includes a decision engine 20, one or more source address tables 22, and a scheduler 24. According to the invention packets coming from the Internet 14 are monitored by the decision engine and the source addresses thereof are examined. If the source address is found in source address table labeled "Good" in FIG. 2 the packet is designated high priority and scheduler 24 places the packet in a queue which is serviced at the highest rate. If the source address of the incoming packet is unknown i.e. not found in the good table it is placed in a queue which is serviced at a lower rate.

Figure 3:
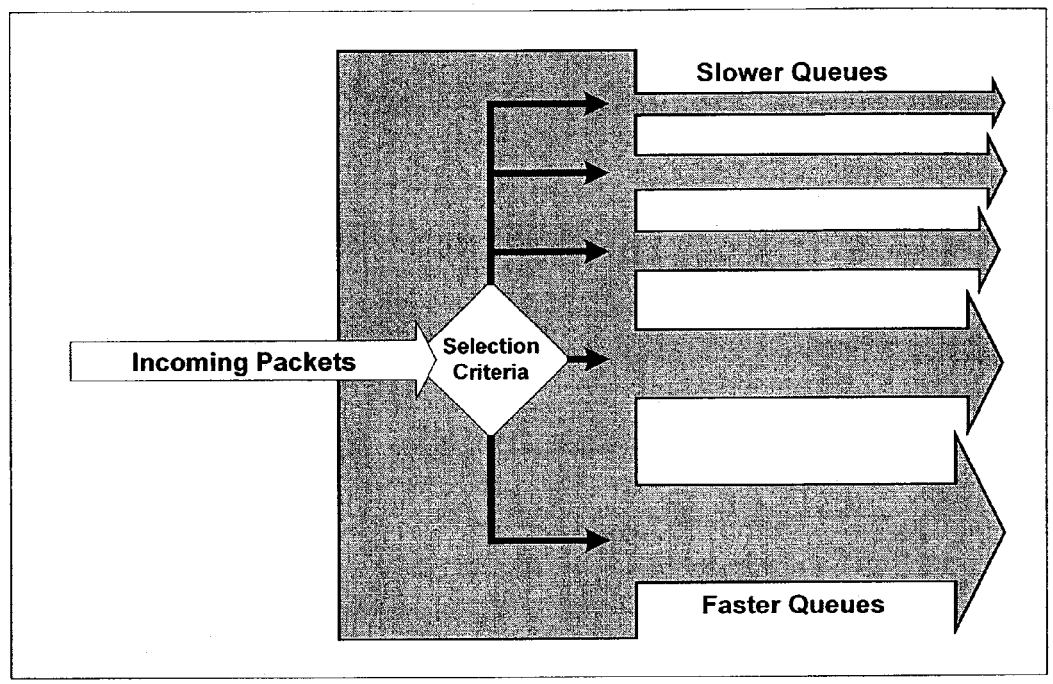
FIG. 3 illustrates traffic priority based on queuing decision.

In FIG. 3 it can be seen that incoming packets are classified into several classes of traffic based on analysis conducted by the decision engine. Multiple classes are defined in the present solution ranging from completely unknown clients to good clients. To move from one group to the next, a client must prove itself to be legitimate. In the present description only two classes (good and unknown/bad) are described but it will be apparent to one skilled in the art that the solution could be extended to multiple classes. It is also to be understood that according to an embodiment of the invention each of the multiple classes will have its own address table.

As indicated previously a table is created which stores the address information of clients that have been designated good for example. When a client transmits a packet, the good table is searched for the client's address. If found, the packet is placed in a higher bandwidth queue and as a result serviced at a higher rate. If the source address is not found within the good table then the packet is placed in a slow queue and the source address maybe added to an "unknown/bad" table. It will be apparent that packets having source addresses that are stored in the "unknown/bad" table can be moved to the "good" table if it ultimately turns out that the packets are received from a legitimate source.

It is also within the scope of the present invention that clients having a source address that are known to be legitimate in advance can be pre-entered in the good table and, therefore, will always be given the highest traffic priority. Similarly, if clients having source addresses which have been established as legitimate but ultimately proved not to be legitimate they will be removed from the "good" table.

To generate the good table each packet is examined. At the IP level it is possible to count the number of times that a source address has been observed. Once the source has been seen multiple times it is added to the good table. The exact number of times that a good source address must be seen before it is added to the good table is a implementation parameter of the system. This feature can be implemented with a counter for each address in the unknown/bad table.

Another selection criteria can be based used for TCP packets. It is known that a TCP packet includes TCP/SYN packet at the beginning of a message and TCP/FIN at the end of a completed session. Since a TCP/FIN packet from inside the LAN indicates a successfully completed session, addresses from the FIN packets can be derived from the TCP/FIN messages and the addresses added to the good table. This could occur after one successful session or after several.

Figure 4:
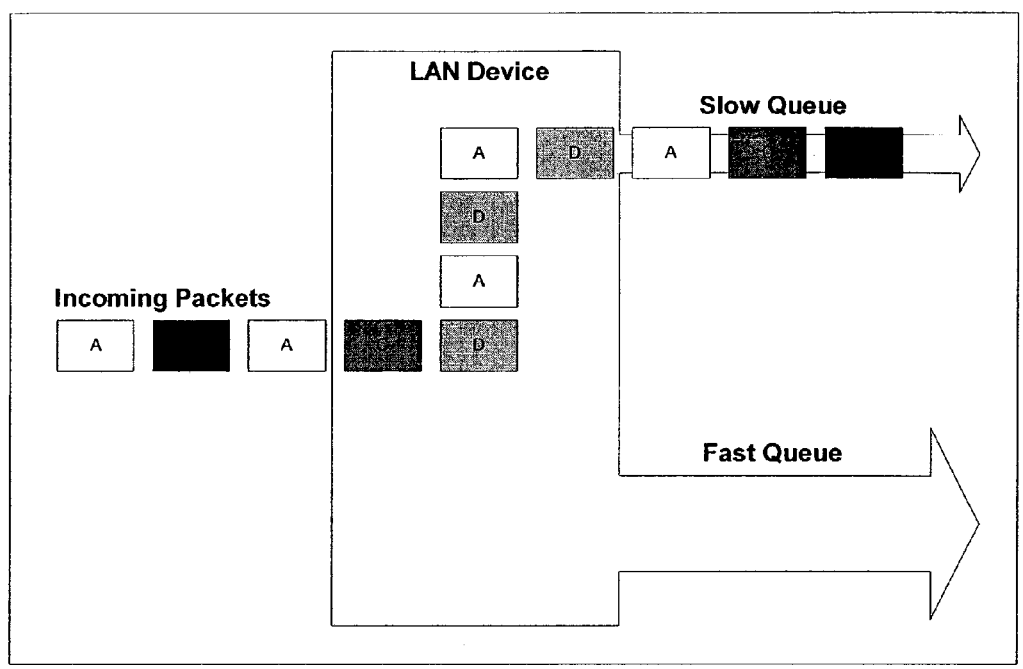
FIG. 4 illustrates connections with spoofed addresses.

FIG. 4 illustrates a packet flow for packets with source address previously unknown or which may contain spoofed IP source addresses such as would be found in a DoS attack. Since all of the incoming packets are not previously known as being containing source addresses of legitimate clients they are all placed sequentially in the slow queue. As indicated previously there may be multiple queues ranging from the fast queue to the slow queue.

Figure 5:
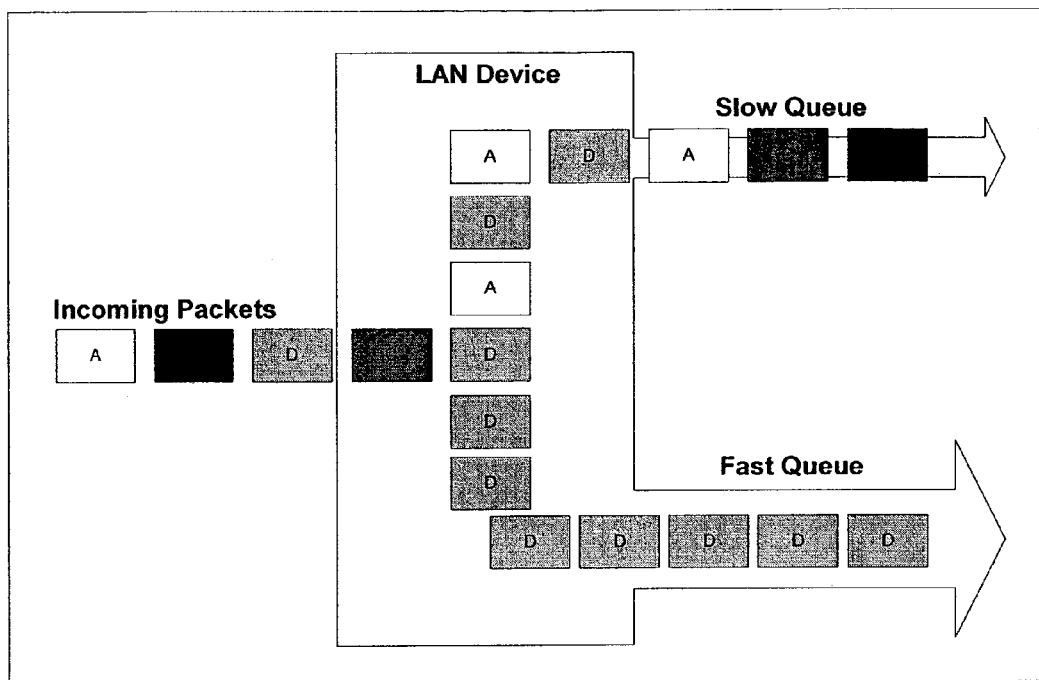
FIG. 5 illustrates established connections with constant address.

FIG. 5 shows the result of incoming packets in which the source address thereof has been moved from the unknown table to the good table during packet flow. As illustrated in the initial stages packets marked D are placed in the source table for unknown addresses but as soon as a number of packets have been examined and judged legitimate they are immediately sent to the queue having the highest priority.

The entries in the tables can be aged out so that only the most recent addresses remain or can be removed using a random early dropped (RED) algorithm. The length of time that entries would remain in the tables depends on traffic mode and the available table storage resources.

The RED algorithm is discussed in an article by Floyd, S., and Jacobson, V., Random Early Detection gateways for Congestion Avoidance, IEEE/ACM Transactions on Networking, V.1 N.4, August 1993, p. 397-413.

Using the solution of the present invention it makes it much more difficult for an attacker to successfully attack Network devices in the LAN using spoofed packets. Previously, the biggest difficulty in reacting to an attack stems from the fact that the attacker can insert any source address in their packets.

When the mechanism disclosed herein is implemented, the attacker must provide a legitimate, or stable, address (or successfully complete a connection) in order to have his address added to the "good" table. At this point the attacker can carry out a packet flooding attack, but all the packets must contain the same source address. This makes it possible to block packets from a specific address if it is determined that an attack is underway.

Legitimate users may see a slowdown for the first few packets of their connection, but then quickly will be upgraded to regular bandwidth and therefore should see little effect on their total bandwidth.

The solution presented herein may be less effective in situations where users make only one connection or short connections with long gaps in between. In those situations, no legitimate user ever stays on the "good" list long enough to gain the benefits of the high priority queue. In addition, a packet flooding attack will now fill the low priority queue and since the legitimate packets are considered as unknown as well they will be lost within the queue. It is possible to use a Random Early Drop algorithm on this queue to combat this disadvantage.

Although specific embodiments of the invention have been described and illustrated it will be apparent to one skilled in the art that numerous changes can be made to the basic concept. It is to be understood, however, that such changes will fall within the full scope of the invention as defined by the appended claims.

We claim:

1. An apparatus for protecting network devices connected to a communications network against service disrupting attacks, comprising:
   at least two queues for queuing packets according to a level of trust assigned to the respective queue;
   a source address table for each of said queues, the source address table listing addresses of all sources in said communication network having the level of trust assigned to the respective queue wherein said source address tables have relative levels of trust ranging from legitimate to unknown;

a decision engine for receiving packets from the communications network and queuing each of the packets in the queues in dependence upon a source address of the respective packet as identified in said source address table; and a scheduler for de-queuing packets from the queues for transmission to the network devices, wherein packets from the queues with a higher level of trust are de-queued at a higher rate than packets from a queue with a lower level of trust, and further comprising means to count a multiple number of times a source address is identified in the incoming packets and to place said source addresses in a source address table associated with a high level of trust after receiving N packets with said source address, where N is a positive integer exceeding a specific threshold.

2. The apparatus as defined in claim 1 wherein the network devices are connected over a local area network (LAN).

3. The apparatus as defined in claim 1 wherein certain legitimate source addresses can be pre-provisioned into different source address tables according to their relative priorities.

4. An apparatus for protecting network devices connected to a communications network against service disrupting attacks, comprising:

at least two queues for queuing packets according to a level of trust assigned to the respective queue;

a source address table for each of said queues, the source address table listing addresses of all sources in said communication network having the level of trust assigned to the respective queue wherein said source address tables have relative levels of trust ranging from legitimate to unknown;

a decision engine for receiving packets from the communications network and queuing each of the packets in the queues in dependence upon a source address of the respective packet as identified in said source address table; and a scheduler for de-queuing packets from the queues for transmission to the network devices, wherein packets from the queues with a higher level of trust are de-queued at a higher rate than packets from a queue with a lower level of trust, and further counting a multiple number of times a source address is identified in the incoming packets and to place said source addresses in a source address table associated with a high level of trust after receiving N packets with said source address where N is a positive integer exceeding a specific threshold.

5. The apparatus as defined in claim 1 wherein the decision engine is operable to discard packets from the queues in accordance with a RED (Random Early Drop) algorithm.

6. A method of protecting network devices connected to a communications network against service disrupting attacks, comprising:

i) constructing n source address tables, a source address table being a listing of addresses of sources in said communication network having a specified level of trust, wherein n is an integer n=2;

ii) providing n queues, each associated with a source address table, for queuing packets according to a level of trust assigned to the respective queue, wherein said source address tables have relative levels of trust ranging from legitimate to unknown; and iii) for a packet destined to said network device, identifying in said source address tables a source address table that lists a source address of the packet and a queue associated with said source address table;

iv) queuing the packet in said queue; and v) de-queuing packets from the queues for transmission to the network devices, wherein packets from the queues with a higher level of trust are de-queued at a higher rate than packets from a queue with a lower level of trust, wherein step 1) comprises:

counting source addresses of the packets received from said communication network a multiple number of times; and placing a source address in a source address table associated with a certain level of trust after receiving N packets with that source address, where N is a positive integer exceeding a specific threshold.

7. The method as defined in claim 6 wherein step I) comprises: pre-provisioning certain source addresses into the different source address tables according to their level of trust, whenever the level of trust of a source is known.

8. A method as of protecting network devices connected to a communications network against service disrupting attacks, comprising:

i) constructing n source address tables, a source address table being a listing of addresses of sources in said communication network having a specified level of trust, wherein n is an integer n=2;

ii) providing n queues, each associated with a source address table, for queuing packets according to a level of trust assigned to the respective queue, wherein said source address tables have relative levels of trust ranging from legitimate to unknown; and iii) for a packet destined to said network device, identifying in said source address tables a source address table that lists a source address of the packet and a queue associated with said source address table;

iv) queuing the packet in said queue;

v) de-queuing packets from the queues for transmission to the network devices, wherein packets from the queues with a higher level of trust are de-queued at a higher rate than packets from a queue with a lower level of trust, and further counting a multiple number of times a source address is identified in the incoming packets and to place said source addresses in a source address table associated with a high level of trust after receiving N packets with said source address, where N is a positive integer exceeding a specific threshold; and vi) removing entries from the source address tables in accordance with the time that each of the entries has existed in the source address tables.

9. The method as defined in claim 6 further comprising removing packets from the queues in accordance with a RED (Random Early Drop) algorithm.

* * * * *